(12) United States Patent
Torita et al.

(10) Patent No.: US 9,985,274 B2
(45) Date of Patent: May 29, 2018

(54) METHOD OF MANUFACTURING LITHIUM-ION SECONDARY BATTERY ELECTRODE SHEET

(71) Applicant: TOYOTA JIDOSHA KABUSHIKI KAISHA, Toyota-shi, Aichi (JP)

(72) Inventors: Koji Torita, Nagoya (JP); Naohiro Hasama, Kamakura (JP); Ryo Nakatani, Kawasaki (JP)

(73) Assignee: TOYOTA JIDOSHA KABUSHIKI KAISHA, Toyota-shi, Aichi (JP)

(*) Notice: Subject to any disclaimer, the term of this patent is extended or adjusted under 35 U.S.C. 154(b) by 0 days. days.

(21) Appl. No.: 15/324,186

(22) PCT Filed: Jun. 29, 2015

(86) PCT No.: PCT/JP2015/003263
§ 371 (c)(1),
(2) Date: Jan. 5, 2017

(87) PCT Pub. No.: WO2016/006196
PCT Pub. Date: Jan. 14, 2016

(65) Prior Publication Data
US 2017/0179465 A1    Jun. 22, 2017

(30) Foreign Application Priority Data

Jul. 8, 2014    (JP) ................................. 2014-140939

(51) Int. Cl.
*B05D 5/12* (2006.01)
*H01M 4/04* (2006.01)
(Continued)

(52) U.S. Cl.
CPC ....... *H01M 4/0404* (2013.01); *H01M 4/0435* (2013.01); *H01M 4/139* (2013.01);
(Continued)

(58) Field of Classification Search
USPC .......................... 427/115, 355, 356, 359, 365
See application file for complete search history.

(56) References Cited

U.S. PATENT DOCUMENTS 8,039,044 B2 * 10/2011 Hayashi .............. H01M 4/0402
427/123
2005/0241137 A1    11/2005 Suzuki et al.
(Continued)

FOREIGN PATENT DOCUMENTS

| JP | 2005-340188 A | 12/2005 |
| JP | 2010-225291 A | 10/2010 |
| JP | 2013-12327 A  | 1/2013  |

OTHER PUBLICATIONS

International Search Report for PCT/JP2015/003263 dated Sep. 3, 2015 [PCT/ISA/210].
(Continued)

*Primary Examiner* — Brian K Talbot
(74) *Attorney, Agent, or Firm* — Sughrue Mion, PLLC

(57) ABSTRACT

A method of manufacturing a lithium-ion secondary battery electrode sheet disclosed herein includes the step of preparing powder 220 of granulated particles. In this step, the powder (220) of granulated particles (240) including active material particles (241) and a binder (242) is prepared. The powder (220) is deposited on a strip-shaped collector foil (201) that is being conveyed. Then, the powder (220) is removed from widthwise center portions (202) and (203) of the collector foil (201), and a squeegee (106) is brought into contact with the powder (220) remaining on the opposite sides of the center portions (202) and (203) of the collector foil (201), thus adjusting the thickness of the powder (220). Subsequently, the powder (220) remaining on the opposite sides of the center portions (202) and (203) of the collector foil (201) is pressed.

1 Claim, 7 Drawing Sheets

(51) Int. Cl.
*H01M 4/139* (2010.01)
*H01M 10/0525* (2010.01)
*B05C 19/04* (2006.01)
*B05C 19/00* (2006.01)
*B05D 1/40* (2006.01)
*B05C 11/10* (2006.01)
*B05D 3/12* (2006.01)
*B05D 1/12* (2006.01)

(52) U.S. Cl.
CPC ..... *H01M 10/0525* (2013.01); *B05C 11/1005* (2013.01); *B05C 19/00* (2013.01); *B05C 19/008* (2013.01); *B05C 19/04* (2013.01); *B05D 1/12* (2013.01); *B05D 1/40* (2013.01); *B05D 3/12* (2013.01); *B05D 5/12* (2013.01)

(56) References Cited

U.S. PATENT DOCUMENTS

| | | | | |
|---|---|---|---|---|
| 2005/0277024 | A1* | 12/2005 | West | H01M 4/661 |
| | | | | 429/235 |
| 2014/0079872 | A1* | 3/2014 | Uchida | H01M 4/621 |
| | | | | 427/58 |
| 2016/0181651 | A1* | 6/2016 | Tanihara | H01M 4/0409 |
| | | | | 118/712 |

OTHER PUBLICATIONS

Written Opinion for PCT/JP2015/003263 dated Sep. 3, 2015 [PCT/ISA/237].

\* cited by examiner

METHOD OF MANUFACTURING LITHIUM-ION SECONDARY BATTERY ELECTRODE SHEET

CROSS REFERENCE TO RELATED APPLICATIONS

This application is a National Stage of International Application No. PCT/JP2015/003263, filed on Jun. 29, 2015, which claims priority from Japanese Patent Application No. 2014-140939, filed on Jul. 8, 2014, the contents of all of which are incorporated herein by reference in their entirety.

TECHNICAL FIELD

The present invention relates to methods of manufacturing lithium-ion secondary battery electrode sheets. As used herein, the term "secondary battery" refers to a repeatedly rechargeable battery in general. The term "lithium-ion secondary battery" refers to a secondary battery that utilizes lithium ions as electrolytic ions, and that is charged and discharged by movement of electric charges caused by movement of the lithium ions between positive and negative electrodes. A lithium-ion secondary battery is a kind of "non-aqueous electrolyte secondary battery" that uses a non-aqueous electrolyte including a non-aqueous solvent in which an electrolytic salt is dissolved. This application claims priority to Patent Application No. 2014-140939 filed in Japan on Jul. 8, 2014, the entire contents of which are hereby incorporated by reference.

BACKGROUND ART

For example, according to JP 2005-340188 A, granulated particles for an anode and granulated particles for a cathode are prepared. The granulated particles for an anode are provided by binding active material-containing particles with a binder containing conductive assistant particles. The granulated particles for a cathode are also provided by binding active material-containing particles with a binder containing conductive assistant particles. The granulated particles are stacked on anode and cathode collectors, and the granulated particles stacked on the collectors are hot-rolled, thus providing active material layers on the anode and cathode collectors. More specifically, according to JP 2005-340188 A, the granulated particles (powder) are supplied onto the collectors, and layers of the granulated particles on the collectors are hot-rolled by heating the layers of the granulated particles and passing the collectors and the layers of the granulated particles between rotating rollers.

For example, JP 2010-225291 A discloses an embodiment in which positive and negative electrode sheets are provided as strip-shaped electrode sheets, and an active material layer is provided along the longitudinal direction of each electrode sheet. In this embodiment, an exposed portion where a collector is exposed extends along widthwise one end of each electrode sheet. The active material layer is provided on each electrode sheet except the exposed portion such that the active material layer extends in the longitudinal direction of each electrode sheet along the widthwise opposite end thereof. The exposed portion is a portion where no active material layer is provided, and may thus be referred to as an "active material layer-absent portion". A region of a collector foil where no active material layer is provided (i.e., a region of a collector foil defined as the exposed portion) may be referred to as an "active material layer-absent region".

CITATION LIST

Patent Literature

PTL 1: JP 2005-340188 A
PTL 2: JP 2010-225291 A

SUMMARY OF INVENTION

Technical Problem

Providing an active material layer by powder shaping in the above electrode sheet manufacturing method offers various advantages. However, for a lithium-ion secondary battery, an active material layer is provided on a thin collector foil by powder shaping, which is likely to cause powder to lose its shape, for example. Accordingly, embodiments of the present invention provide a suitable method of manufacturing a lithium-ion secondary battery electrode sheet, including the step of providing an active material layer by powder shaping.

Solution to Problem

A method of manufacturing a lithium-ion secondary battery electrode sheet according to an embodiment of the present invention includes: a) preparing a strip-shaped collector foil; b) preparing powder of granulated particles; c) conveying the collector foil; d) depositing the powder; e) adjusting the thickness of the powder; and f) pressing the powder. In Step b), powder of granulated particles including active material particles and a binder is prepared. In Step d), the powder is deposited on the collector foil. In Step e), the powder is removed from a widthwise center region of the collector foil, and a squeegee is brought into contact with the powder remaining on the opposite sides of the center region of the collector foil, thus adjusting the thickness of the powder. In Step f), the powder remaining on the opposite sides of the center region of the collector foil is pressed. Thus, active material layers of high quality are provided.

Step e) may include guiding powder deposited on the collector foil from the widthwise center region of the collector foil to widthwise opposite ends of the collector foil, thus removing the powder from the widthwise center region of the collector foil. Step f) may include pressing the powder remaining on the opposite sides of the center region of the collector foil, with a first guide in contact with inner edges of the powder. Step f) may include pressing the powder remaining on the opposite sides of the center region of the collector foil, with second guides in contact with outer edges of the powder.

DESCRIPTION OF EMBODIMENTS

Hereinafter, a method of manufacturing a lithium-ion secondary battery electrode sheet according to an embodiment of the present invention will be described. The embodiment described herein is naturally not intended to limit the invention in any way. Note that the diagrams are schematic representations. For example, dimensions (e.g., length, width, and thickness) in each diagram do not reflect actual dimensions. Similar components and portions are identified by the same reference signs, and description thereof will be omitted or simplified if deemed redundant.

An exemplary structure of a lithium-ion secondary battery 10 to which the present invention is applicable will be generally described, and then components of the lithium-ion secondary battery 10 we have devised will be specifically described.

<Lithium-Ion Secondary Battery 10>

Figure 1:
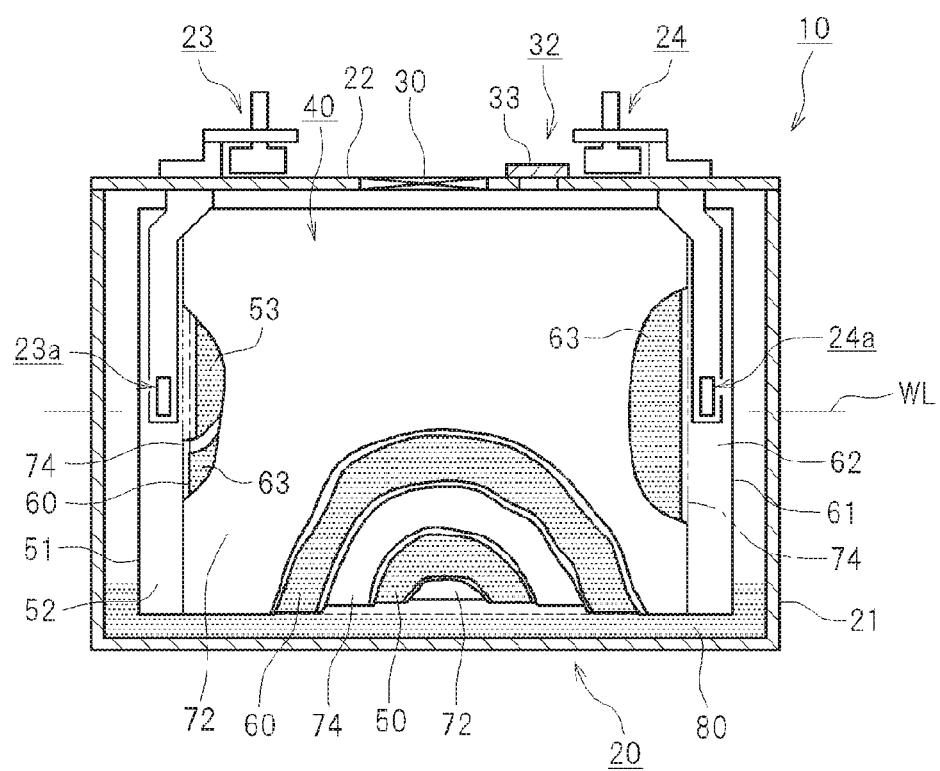
FIG. 1 is a cross-sectional view of a lithium-ion secondary battery.
Figure 2:
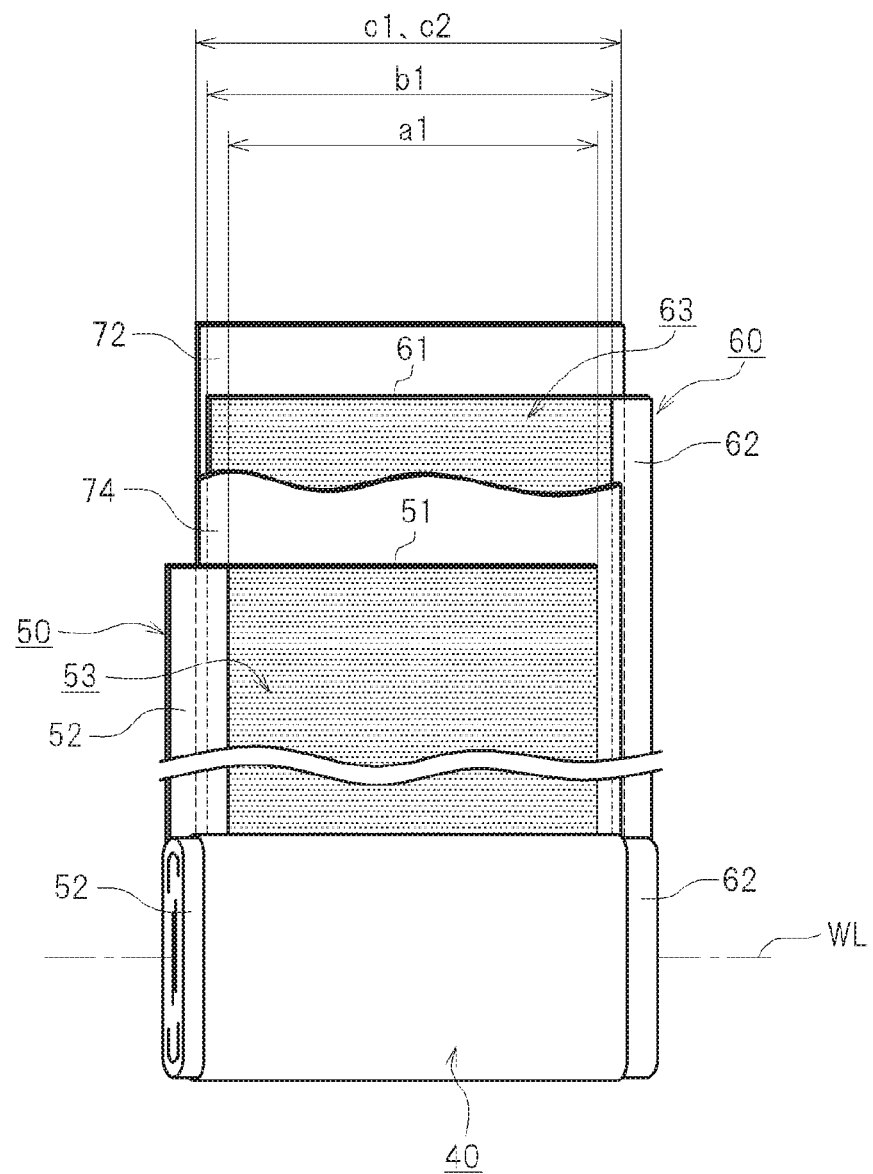
FIG. 2 is a diagram illustrating an electrode assembly to be disposed in the lithium-ion secondary battery.

FIG. 1 is a cross-sectional view of the lithium-ion secondary battery 10. FIG. 2 is a diagram illustrating an electrode assembly 40 to be disposed in the lithium-ion secondary battery 10. Note that the lithium-ion secondary battery 10 illustrated in FIG. 1 is merely an example of a lithium-ion secondary battery to which the present invention is applicable. This means that the lithium-ion secondary battery to which the present invention is applicable is not limited to any particular lithium-ion secondary battery.

As illustrated in FIG. 1, the lithium-ion secondary battery 10 includes a battery case 20 and the electrode assembly 40 (which is illustrated as a wound electrode assembly in FIG. 1).

<Battery Case 20>

The battery case 20 includes a case body 21 and a sealing plate 22. The case body 21 has a box shape with an opening at its one end. Specifically, the case body 21 has a rectangular parallelepiped shape with an opened surface that serves as the upper surface during normal use of the lithium-ion secondary battery 10. In this embodiment, the case body 21 is provided with a rectangular opening. The sealing date 22 closes the opening of the case body 21. The sealing plate 22 is a substantially rectangular plate. The sealing plate 22 is welded to the peripheral edge of the opening of the case body 21, thus providing the battery case 20 having a substantially hexahedral shape.

The battery case 20 is preferably mainly composed of a lightweight, highly thermally conductive metal material. Examples of such a metal material include aluminum, stainless steel, and nickel-plated steel. The battery case 20 (including the case body 21 and the sealing plate 22) according to the present embodiment is composed of aluminum or an alloy consisting mainly of aluminum.

In the example illustrated in FIG. 1, a positive electrode terminal (terminal) 23 and a negative electrode terminal (external terminal) 24 for external connection are attached to the sealing plate 22. The sealing plate 22 is provided with a safety vent 30 and a filling port 32. The safety vent 30 is configured to release the internal pressure of the battery case 20 when the internal pressure is increased to or above a predetermined level (e.g., a set injection-valve opening pressure ranging from about 0.3 MPa to about 1.0 MPa). FIG. 1 illustrates the filling port 32 that is sealed with a sealant 33 after an electrolyte 80 is injected therethrough. The electrode assembly 40 is housed in the battery case 20.

<Electrode Assembly (Wound Electrode Assembly) 40>

As illustrated in FIG. 2, the electrode assembly 40 includes: a strip-shaped positive electrode (or positive electrode sheet 50); a strip-shaped negative electrode (for negative electrode sheet 60); and strip-shaped separators (or separators 72 and 74).

<Positive Electrode Sheet 50>

The positive electrode sheet 50 includes a strip-shaped positive electrode collector foil 51, and a positive electrode active material layer 53. A metal foil suitable for the positive electrode is preferably used as the positive electrode collector foil 51. For example, a strip-shaped aluminum foil with a predetermined width and a thickness of about 15 nm may be used as the positive electrode collector foil 51. An exposed portion 52 extends along widthwise one edge of the positive electrode collector foil 51. In the illustrated example, the positive electrode active material layer 53 is provided on both surfaces of the positive electrode collector foil 51 except the exposed portion 52 of the positive electrode collector foil 51. The positive electrode active material layer 53 contains at least a positive electrode active material, and is held on the positive electrode collector foil 51.

Any one or more types of materials conventionally used for a lithium-ion secondary battery may be used as the positive electrode active material. Preferable examples of such materials include: a lithium transition metal oxide containing, as constituent metal elements, lithium and a transition metal element, such as a lithium nickel oxide ($LiNiO_2$), a lithium cobalt oxide ($LiCoO_2$) or a lithium manganese oxide ($LiMn_2O_4$); and a lithium transition metal phosphate containing, as constituent metal elements, lithium and a transition metal element, such as a lithium manganese phosphate ($LiMnPO_4$) or a lithium iron phosphate ($LiFePO_2$). The positive electrode active material is used in particle form, and may thus be referred to as "positive electrode active material particles" as appropriate.

<Negative Electrode Sheet 60>

As illustrated in FIG. 2, the negative electrode sheet 60 includes a strip-shaped negative electrode collector foil 61, and a negative electrode active material layer 63. A metal foil suitable for the negative electrode is preferably used as the negative electrode collector foil 61. For example, a strip-shaped copper foil with a predetermined width and a thickness of about 10 mm may be used as the negative electrode collector foil 61. An exposed portion 62 extends along widthwise one edge of the negative electrode collector foil 61. The negative electrode active material layer 63 is provided on both surfaces of the negative electrode collector foil 61 except the exposed portion 62 of the negative electrode collector foil 61. The negative electrode active material layer 63 contains at least a negative electrode active material, and is held on the negative electrode collector foil 61.

Any one or more types of materials conventionally used for a lithium-ion secondary battery may be used as the negative electrode active material. Preferable examples of such materials include: a carbon material, such as graphite carbon or amorphous carbon; a lithium transition metal oxide; and a lithium transition metal nitride. The negative electrode active material is used in particle form, and may thus be referred to as "negative electrode active material particles" as appropriate. The positive electrode active material particles and the negative electrode active material particles may be referred to as "active material particles" as appropriate. The positive electrode active material particles and the negative electrode active material particles may be used in powder form where suitable. In this embodiment, the positive electrode active material layer 53 and the negative electrode active material layer 63 may each contain a conductive material, a binder and/or a thickener.

<Conductive Material>

Examples of the conductive material include carbon materials, such as carbon powder and carbon fiber. One type of such conductive materials may be used alone, or two or more types of such conductive materials may be used in combination. Examples of carbon powder to be used include acetylene black, oil furnace black, graphitized carbon black, carbon black, graphite, and Ketjen black.

<Binder, Thickener>

The binder serves to bond particles of the positive electrode active material and the conductive material contained in the positive electrode active material layer 53, and to bond these particles to the positive electrode collector foil 51, or serves to bond particles of the negative electrode active material and the conductive material contained in the negative electrode active material layer 63, and to bond these particles to the negative electrode collector foil 61. A polymer dissolvable or dispersible in a solvent to be used may be utilized as the binder. For an aqueous solvent, preferable examples of the polymer to be used include aqueous or water-dispersible polymers such as: fluorocarbon polymers (e.g., polytetrafluoroethylene [PTFE], and a tetrafluoroethylene-hexafluoropropylene copolymer [FEP]); rubbers (e.g., a styrene-butadiene copolymer [SBR], and acrylic acid-modified SBR resin [such as SBR latex]); polyvinyl alcohol (PVA); a vinyl acetate copolymer; and an acrylate polymer. For a non-aqueous solvent, preferable examples of the polymer to be used include polymers such as polyvinylidene fluoride (PVDF), polyvinylidene chloride (PVDC), and poly-acrylonitrile (PAN). Preferable examples of the thickener to be used include cellulose polymers, such as carboxymethyl cellulose (CMC) and hydroxylpropyl methyl-cellulose (HPMC).

<Separators 72, 74>

As illustrated in FIG. 2, the separators 72 and 74 separate the positive electrode sheet 50 and the negative electrode sheet 60 from each other. In this example, the separators 72 and 74 are each composed of a strip-shaped, microporous sheet material with a pre-determined width. For example, porous resin films, such as single-layer or multi-layer structure separators composed of porous polyolefin resin, may be used as the separators 72 and 74. In this example, as illustrated in FIG. 2, the width b1 of the negative electrode active material layer 63 is slightly larger than the width a1 of the positive electrode active material layer 53. The widths c1 and c2 of the separators 72 and 74 are slightly larger than the width b1 of the negative electrode active material layer 63 (c1, c2>b1>a1).

The separators 72 and 74 insulate the positive electrode active material layer 53 and the negative electrode active material layer 63 from each other, but allow electrolyte movement therethrough. Although not illustrated, the separators 72 and 74 may each be provided with a heat resistance layer at the surface of a base composed of a porous plastic film. The heat resistance layer includes a filler and a binder. The heat resistance layer may be referred to as an "HRL".

<Structure of Electrode Assembly 40>

As illustrated in FIG. 2, the electrode assembly 40 has a flat shape along one plane including a winding axis WL in this embodiment. In the example illustrated in FIG. 2, the exposed portion 52 of the positive electrode collector foil 51 and the exposed portion 62 of the negative electrode collector foil 61 are exposed spirally on the opposite sides of the separators 72 and 74. As illustrated in FIG. 1, the exposed portions 52 and 62 protruded from the separators 72 and 74 are respectively welded to extremities 23a and 24a of the positive and negative electrode terminals 23 and 24, which are disposed inside the battery case 20.

In the example illustrated in FIG. 1, the wound electrode assembly 40, which is flat along one plane including the winding axis WL, is housed in the battery case 20. The electrolyte 80 is injected into the battery case 20. The electrolyte 80 infiltrates into the electrode assembly 40 from both sides thereof along the winding axis WL (see FIG. 2).

<Electrolyte (Liquid Electrolyte) 80>

Any non-aqueous electrolyte similar to those conventionally used for a lithium-ion secondary battery may be used as the electrolyte 80. Such a non-aqueous electrolyte is typically prepared by dissolving a supporting electrolyte in a suitable non-aqueous solvent. For example, the non-aqueous solvent to be used may include one or more compounds selected from the group consisting of: ethylene carbonate (hereinafter referred to as "EC" where appropriate): propylene carbonate; dimethyl carbonate (hereinafter referred to as "DMC" where appropriate); diethyl carbonate; ethyl methyl carbonate (hereinafter referred to as "EMC" where appropriate); 1,2-dimethoxyethane; 1,2-diethoxyethane; tetrahydrofuran; and 1,3-dioxolane. Examples of the supporting electrolyte to be used include lithium salts, such as $LiPF_6$, $LiAsF_4$, $LiCF_3SO_3$, $LiC_4F_9SO_3$, $LiN(CF_3SO_2)_2$, and $LiC(CF_3SO_2)_3$. One example of the non-aqueous electrolyte is prepared by dissolving $LiPF_6$ at a concentration of about 1 mol/L in a solvent mixture of ethylene carbonate and diethyl carbonate (which are mixed at a volume ratio of 1:1, for example).

Note that FIG. 1 schematically illustrates the electrolyte 80 injected into the battery case 20, and thus does not precisely illustrate the amount of the electrolyte 80 injected into the battery case 20. The electrolyte 80 injected into the battery case 20 is sufficiently infiltrated through, for example, voids in the positive electrode active material layer 53 and the negative electrode active material layer 63 inside the wound electrode assembly 40.

The positive and negative electrode collector foils 51 and 61 of the lithium-ion secondary battery 10 are electrically connected to an external device through the electrode terminals 23 and 24 extending through the battery case 20. How the lithium-ion secondary battery 10 is charged and discharged will be described below.

<Charging of Lithium-Ion Secondary Battery 10>

During charging of the lithium-ion secondary battery 1C, a voltage is applied between the positive and negative electrode sheets 50 and 60, thus releasing lithium ions (Li) into the electrolyte from the active material in the positive electrode active material layer 53, and releasing electric charges from the positive electrode active material layer 53. The electric charges are accumulated in the negative electrode sheet 60, and the lithium ions (Li) in the electrolyte are absorbed into and stored in the active material in the negative electrode active material layer 63. This results in a potential difference between the positive and negative electrode sheets 50 and 60.

<Discharging of Lithium-Ion Secondary Battery 10>

During discharging of the lithium-ion secondary battery 10, a potential difference between the positive and negative electrode sheets 50 and 60 causes electric charges to move from the negative electrode sheet 60 to the positive electrode sheet 50, and causes lithium ions stored in the negative electrode active material layer 63 to be released into the electrolyte. The lithium ions released into the electrolyte are captured by the active material in the positive electrode active material layer 53.

Thus, lithium ions are released from the active material in the positive electrode active material layer 53 and stored in the active material in the negative electrode active material layer 63 during charging of the lithium-ion secondary battery 10, and lithium ions are released from the active material in the negative electrode active material layer 63 and stored in the active material in the positive electrode active material layer 53 during discharging of the lithium-ion secondary battery 10. Lithium ions move between the positive and negative electrode active material layers 53 and 63 through the electrolyte.

The present inventors have studied techniques for providing the positive and negative electrode active material layers 53 and 63 of the positive and negative electrode sheets 50 and 60 of the lithium-ion secondary battery 10 by shaping powder of granulated particles including active material particles and a binder. For example, on a laboratory level, such powder shaping is performed by depositing powder on a collector foil and pressing the powder. However, the manufacture of an electrode sheet for a lithium-ion secondary battery makes it necessary to provide an active material layer on a very thin, long, strip-shaped collector foil. Unfortunately, merely depositing powder on a collector foil and pressing the powder is unlikely to ensure high productivity while maintaining high quality.

In view of this, it is clear that techniques for providing the positive and negative electrode active material layers 53 and 63 by shaping powder of granulated particles including active material particles and a binder are not yet fully established. Accordingly, the present inventors provide a novel lithium-ion secondary battery electrode sheet manufacturing method that makes it possible to provide active material layers of invariably high quality.

Figure 3:
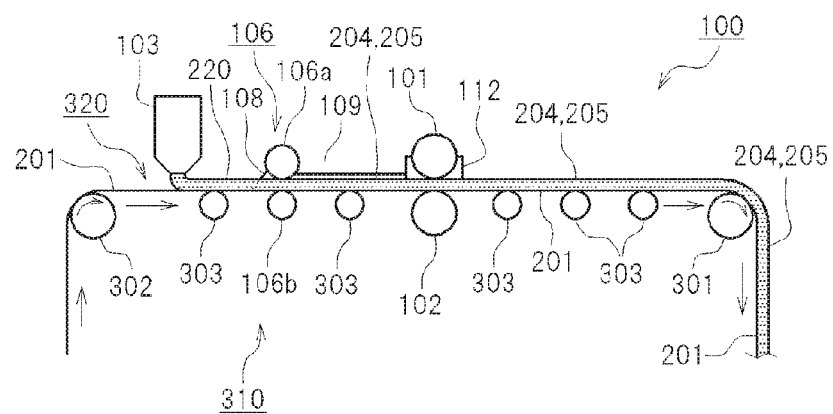
FIG. 3 is a side view of a manufacturing apparatus 100 by which a lithium-ion secondary battery electrode sheet manufacturing method is carried out.
Figure 4:
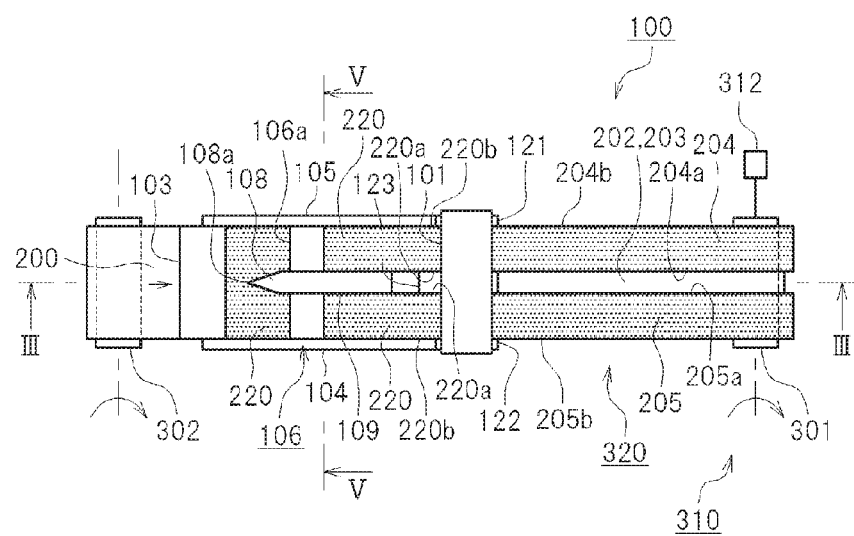
FIG. 4 is a plan view of the manufacturing apparatus 100.

FIG. 3 is a side view of a manufacturing apparatus 100 by which the lithium-ion secondary battery electrode sheet manufacturing method is carried out. FIG. 4 is a plan view of the manufacturing apparatus 100.

The manufacturing apparatus 100 includes: a conveyer 310 that conveys a collector foil 201; reduction rollers 101 and 102; a quantitative feeder (powder supply device) 103; outer guides 104 and 105; a squeegee 106; a powder remover 108; and an inner guide 109.

<Conveyer 310>

The conveyer 310 includes a plurality of rollers that conveys the collector foil 201. More specifically, the conveyer 310 includes: a conveying roller 301 provided with a driving mechanism 312; a driven roller 302, that rotates in accordance with rotation of the conveying roller 301; and a plurality of pulleys 303 that rotates while supporting the collector foil 201. The strip-shaped collector foil 201 prepared in this embodiment is a "dual-strip" collector foil that has a width for two strip-shaped electrode sheets to be used in a battery. The dual-strip collector foil 201 is conveyed by the rollers of the conveyer 310.

<Quantitative Feeder 103>

The quantitative feeder 103 is disposed above the strip-shaped collector foil 201 conveyed by the conveyer 310. The quantitative feeder 103 supplies powder 220 of granulated particles onto the collector foil 201 conveyed by the conveyer 310. The step of preparing the powder 220 of granulated particles will be described below.

<Outer Guides 104, 105>

Figure 5:
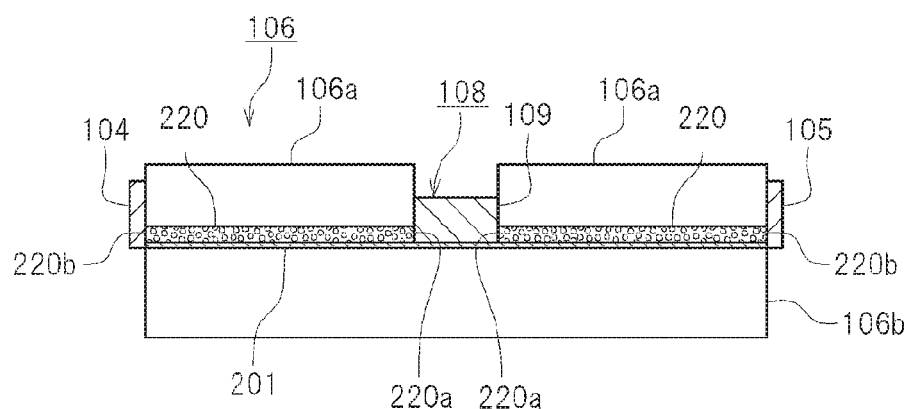
FIG. 5 is a cross-sectional view of a conveyance path for a collector foil 201, taken along the line V-V of FIG. 4.

FIG. 5 is a cross-sectional view of a conveyance path 320 for the collector foil 201, taken along the line V-V of FIG. 4. As illustrated in FIG. 5, the outer guides 104 and 105 are disposed on the widthwise opposite sides of the collector foil 201 along the conveyance path 320 of the conveyer 310. In this embodiment, the outer guides 104 and 105 include walls extending along the widthwise opposite edges of the collector foil 201. The outer guides 104 and 105 are each continuous along the conveyance path 320 of the conveyer 310 from a region where the quantitative feeder 103 is disposed to a region where the reduction rollers 101 and 102 are disposed. It is to be noted that the outer guides 104 and 105 on the widthwise opposite sides of the collector foil 201 do not necessarily have to be provided. In the absence of the outer guides 104 and 105, an excess portion of the powder 220 falls from both sides of the collector foil 201, but outer edges 220b of the powder 220 are shaped with a certain precision. No powder 220 will be wasted if an excess portion of the powder 220, falling from both sides of the collector foil 201, is received and collected by a tray, for example. Note that the outer guides 104 and 105 on the widthwise opposite sides of the collector foil 201 enable the outer edges 220b of the powder 220 to be shaped with higher precision. Thus, it is preferable that the outer guides 104 and 105 be provided on the widthwise opposite sides of the collector foil 201 as illustrated in FIG. 4.

<Squeegee 106>

The squeegee 106 adjusts the thickness of the powder 220 supplied onto the collector foil 201. In this embodiment, the squeegee 106 is located in the conveyance path 320 of the conveyer 310 and between the region where the quantitative feeder 103 is disposed and the region where the reduction rollers 101 and 102 are disposed. The squeegee 106 consists of a pair of rollers, i.e., a squeegee roller 106a and a back roller 106b. The squeegee roller 106a is disposed at a predetermined distance from the upper surface of the collector foil 201. The back roller 106b is disposed under the collector foil 201 and opposite to the squeegee roller 106a. The back roller 106b supports the lower surface of the collector foil 201 in a region where the squeegee roller 106a is in contact with the powder 220 on the collector foil 201. Supporting the lower surface of the collector foil 201 by the hack roller 106b in this manner allows the distance between the collector foil 201 and the squeegee roller 106a to be kept constant. While the powder 220 supplied onto the collector foil 201 passes through the squeegee 106, the thickness of the powder 220 is adjusted to a thickness corresponding to the distance between the upper surface of the collector foil 201 and the squeegee roller 106a. Although the squeegee 106 consists of rollers in the example illustrated in FIGS. 3 and 4, the squeegee 106 is not limited to rollers. Alternatively, the squeegee 106 may consist of blades (or plate blades), for example.

<Powder Remover 108>

Figure 6:
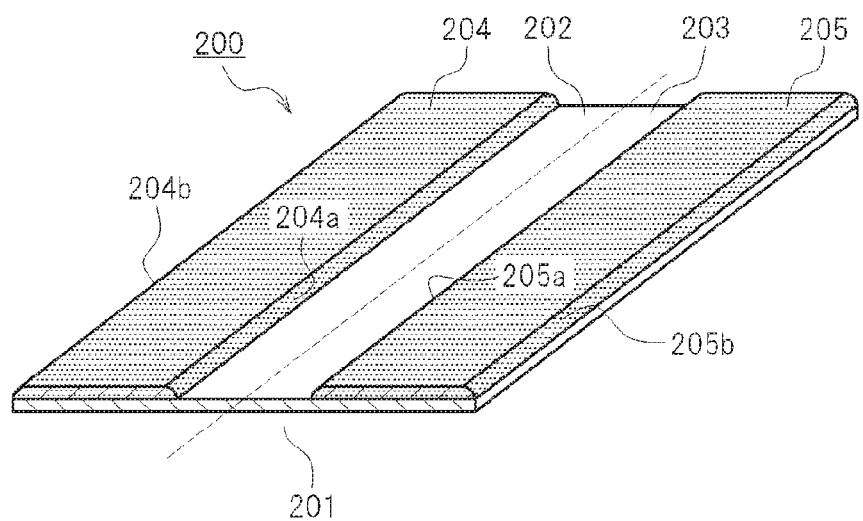
FIG. 6 is a diagram illustrating an intermediate product of a "dual-strip" electrode sheet.
Figure 7:
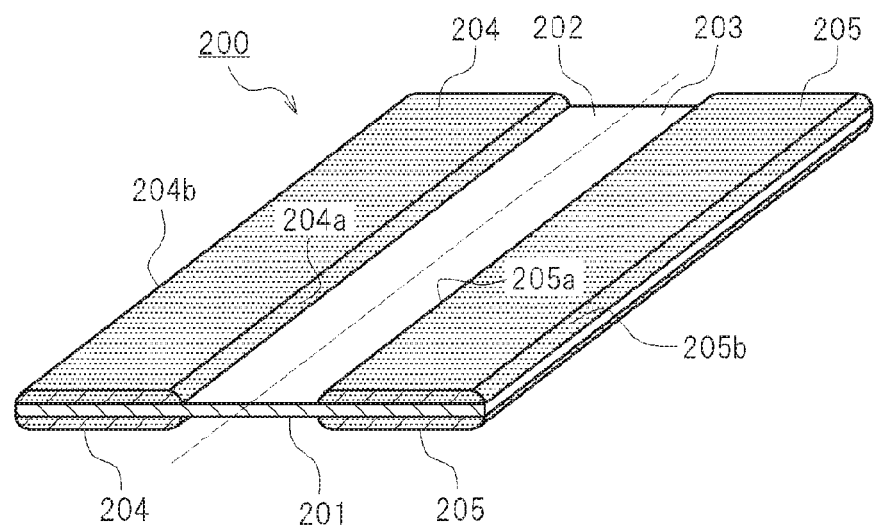
FIG. 7 is a diagram illustrating the dual-strip electrode sheet before being cut.
Figure 8:
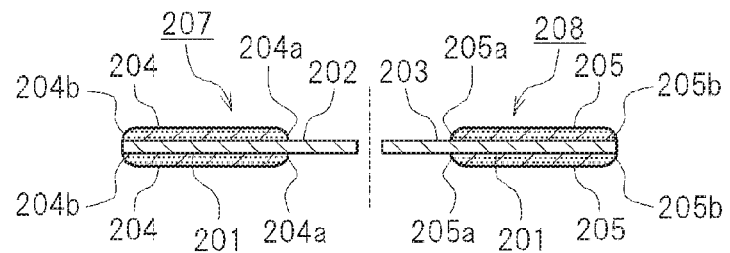
FIG. 8 is a diagram illustrating the dual-strip electrode sheet that has been cut.

The powder remover 108 partially removes the powder 220 deposited on the collector foil 201. In this embodiment, the powder remover 108 is disposed in front of the squeegee roller 106a such that the powder remover 108 is located on widthwise center portions (widthwise center region) 202 and 203 of the collector foil 201 and extends along the longitudinal direction of the collector foil 201. FIG. 6 is a diagram illustrating an intermediate product of a "dual-strip" electrode sheet 200. FIG. 7 is a diagram illustrating the dual-strip electrode sheet 200 before being cut. FIG. 8 is a diagram illustrating the dual-strip electrode sheet 200 that has been cut into electrode sheets 207 and 208. The sum of the widths of the widthwise center portions 202 and 203 of the collector foil 201 from which the powder 220 is removed by the powder remover 108 (see FIG. 6) is equal or substantially equal to the sum of the widths of the exposed portions 202 and 203 of the "single-strip" electrode sheets 207 and 208 (see FIG. 8). Note that the exposed portions of the electrode sheets 207 and 208 correspond to the widthwise center portions 202 and 203 of the collector foil 201 of the electrode sheet 200, and are thus also represented by the reference signs 202 and 203. In this embodiment, when the collector foil 201 is conveyed to the powder remover 108, the powder remover 108 removes the powder 220 from the center portions 202 and 203 of the collector foil 201. For example, the powder remover 108 is preferably disposed such that it slides on the collector foil 201. The powder remover 108 is preferably supported by, for example, the quantitative feeder 103, the outer guides 104 and 105, or the squeegee 106.

In this embodiment, the powder remover 108 includes a front end 108a gradually tapered toward the widthwise center in an upstream portion of the conveyance path 320 (from which the collector foil 201 is to be conveyed). The powder remover 108 pushes its way through the powder 220 on the center portions 202 and 203 of the collector foil 201 so as to divide the powder 220 into right and left portions. Findings of the present inventors indicate that when the powder remover 108 removes the powder 220 from the widthwise center portions 202 and 203 so as to divide the powder 220 into right and left portions, the powder 220 is smoothly pushed aside to right and left. In this embodiment, the front end 108a of the powder remover 108 comes into contact with the powder 220 on the widthwise center portions 202 and 203 of the collector foil 201, and the powder remover 108 pushes the powder 220 aside to right and left. This smoothly removes the powder 220 from the widthwise center portions 202 and 203 of the collector foil 201. Thus, inner edges 220a of the right and left portions of the powder 220 (i.e., edges of the right and left portions of the powder 220 adjoining the widthwise center portions 202 and 203 of the collector foil 201) are shaped with high precision.

<Inner Guide 109>

The inner guide 109 has a width equal to that of the rear end of the powder remover 108. The inner guide 109 extends rearward from the rear end of the powder remover 108 along the conveyance path 320. As illustrated in FIG. 4, the inner guide 109 supports the inner edges 220a of the right and left portions of the powder 220, which have been pushed aside from the center portions 202 and 203 of the collector foil 201 by the powder remover 108. For example, the inner guide 109 is preferably disposed such that it slides on the collector foil 201. The reduction rollers 101 and 102 are provided downstream of the inner guide 109 in the conveyance direction of the conveyance path 320.

<Reduction Rollers 101, 102>

The reduction rollers 101 and 102 press the powder 220 against the collector foil 201 to provide deposited layers 204 and 205 of the powder 220 on the collector foil 201. Note that the deposited layers 204 and 205 may also be referred to as "active material layers 204 and 205". The powder 220 on the collector foil 201 to be sent to the reduction rollers 101 and 102 is removed from the widthwise center portions 202 and 203 by the powder remover 108.

The reduction roller 101 is disposed at a predetermined distance from the upper surface of the collector foil 201. The reduction roller 102 serves as a back roller for the reduction roller 101. The reduction roller 102 is disposed under the collector foil 201 and opposite to the reduction roller 101. The reduction roller 102 supports the lower surface of the collector foil 201 in a region where the reduction roller 101 presses against the powder 220 on the collector foil 201. Supporting the lower surface of the collector foil 201 by the reduction roller 102 in this manner allows the distance between the collector foil 201 and the reduction roller 101 to be kept constant. While the powder 220 supplied onto the collector foil 201 passes between the reduction rollers 101 and 102, the powder 220 is pressed against the upper surface of the collector foil 201, and the thickness of the powder 220 is adjusted to a thickness corresponding to the distance between the collector foil 201 and the reduction roller 101.

The powder 220 is compressed between the reduction rollers 101 and 102 and pressed against the collector foil 201 while being passed between the reduction rollers 101 and 102. The powder 220 contains a binder component. Because the powder 220 is compressed and pressed against the collector foil 201, an area where the binder adheres to the particles in the powder 220 and the collector foil 201 widens. This increases the adhesion between the powder 220 and the collector foil 201 and between the particles of the powder 220, enhancing the bonding strength of the powder 220.

The gap between the squeegee roller 106a and the collector foil 201 determines the thickness of the powder 220 to be sent to the reduction rollers 101 and 102. The gap between the reduction roller 101 and the collector foil 201 determines the thickness of the powder 220 (i.e., the deposited layers 204 and 205) which has passed between the reduction rollers 101 and 102. The gap between the squeegee roller 106a and the collector foil 201 differs from the gap between the reduction roller 101 and the collector foil 201. Thus, this difference determines the densities of the active material layers 204 and 205 that have passed between the reduction rollers 101 and 102.

During passage of the collector foil 201 between the reduction rollers 101 and 102, widthwise opposite portions of the collector foil 201 on which the powder 220 has been deposited (i.e., portions of the collector foil 201 on which the deposited layers 204 and 205 have been provided) receive pressure from the reduction rollers 101 and 102. In contrast, the active material layer-absent regions 202 and 203 (i.e., the widthwise center portions 202 and 203) of the collector foil 201 receive no pressure front the reduction rollers 101 and 102. Note that the active material layer-absent regions of the collector foil 201 correspond to the widthwise center portions 202 and 203, and are thus also represented by the reference signs 202 and 203. Because the powder 220 is deposited on the widthwise opposite portions of the collector foil 201, during passage of the collector foil 201 between the reduction rollers 101 and 102, the widthwise opposite portions of the collector foil 201 are stretched, and the center portions of the collector foil 201 are also stretched accordingly. This reduces strain that may occur in the collector foil 201 during its passage between the reduction rollers 101 and 102.

Figure 9:
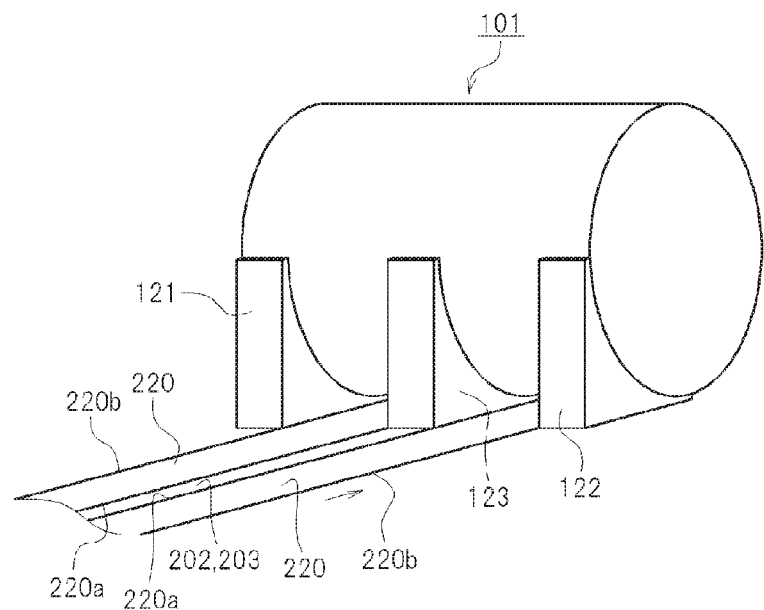
FIG. 9 is a perspective view of a reduction roller 101 disposed above the collector foil 201.

FIG. 9 is a perspective view of the reduction roller 101 disposed above the collector foil 201. In FIG. 9, the inner guide 109 is not illustrated. As illustrated in FIG. 9, the reduction roller 101 includes walls 121, 122, and 123 in this embodiment. The walls 121, 122, and 123 serve to suitably keep the powder 220 on the collector foil 201 while the powder 220 is pressed. The walls 121 and 122 are disposed on the opposite sides of the collector foil 201, which passes therebetween, so as to support the outer edges 220*b* of the powder 220. The wall 123 is disposed behind the inner guide 109 such that the wall 123 is located on the active material layer-absent regions 202 and 203 of the collector foil 201, from which the powder 220 has been removed, so as to support the inner edges 220*a* of the powder 220.

Before being passed between the reduction rollers 101 and 102, the powder 220 of granulated particles is removed from the widthwise center portions 202 and 203 of the collector foil 201 by the powder remover 108. Thus, the right and left portions of the powder 220 to be passed between the reduction rollers 101 and 102 are uniform in shape. The powder 220 remaining on the opposite sides of the center portions 202 and 203 of the collector foil 201 is then pressed by the reduction rollers 101 and 102. Consequently, the electrode sheets 207 and 208 of high quality are obtained as illustrated in FIG. 8. In this embodiment, the powder 220 is pressed, with the inner edges 220*a* supported by the wall 123 and the outer edges 220*b* supported by the walls 121 and 122. As a result, the deposited layers 204 and 205 have inner edges 204*a* and 205*a* and outer edges 204*b* and 205*b* which are shaped with high precision.

Figure 10:
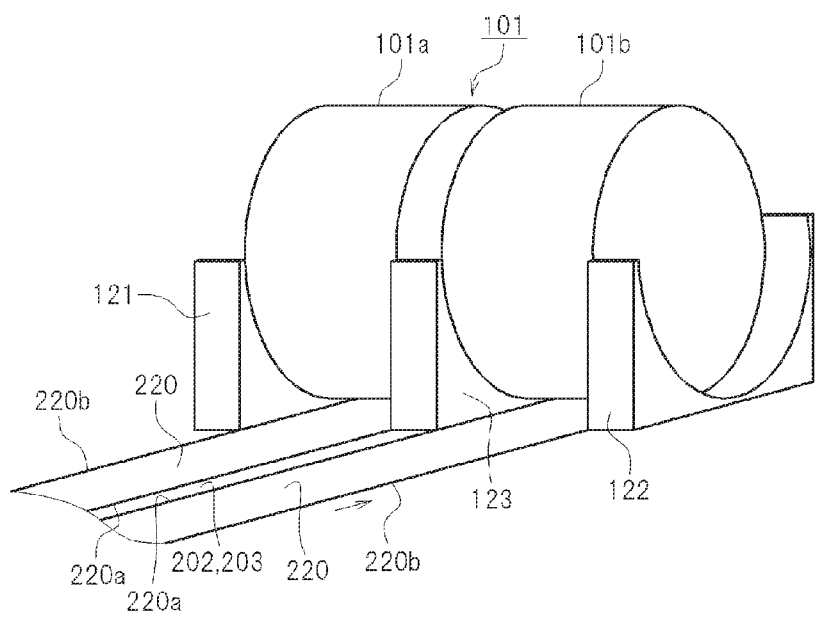
FIG. 10 is a perspective view of a variation of the reduction roller 101.

Next, a variation of the reduction roller 101 will be described. FIG. 10 is a perspective view of the variation of the reduction roller 101. As illustrated in FIG. 10, the reduction roller 101. In this variation includes: a left roller 101*a* located between the wall 121 and the center wall 123; and a right roller 101*b* located between the wall 122 and the center wall 123. Thus, the left roller 101*a* and the right roller 101*b* are independent of each other.

In the electrode sheet 200 manufactured by the manufacturing apparatus 100, the widthwise center portions 202 and 203 of the dual-strip collector foil 201 serve as the active material layer-absent regions 202 and 203, and the active material layers 204 and 205, which are the deposited layers 204 and 205 of the powder 220, are provided on the opposite sides of the active material layer-absent regions 202 and 203. As illustrated in FIG. 7, the active material layers 204 and 205, which are the deposited layers 204 and 205 of the powder 220, are preferably provided also on the opposite surface of the collector foil 201 such that the active material layers 204 and 205 are located on the opposite sides of the widthwise center portions 202 and 203. As illustrated in FIG. 8, the collector foil 201 is cut longitudinally along the widthwise center thereof, thus providing two single-strip electrode sheets, i.e., the electrode sheets 207 and 208. In this case, the active material layers 204 and 205, which are the deposited layers 204 and 205 of the powder 220, are not cut. Thus, foreign matter resulting front cutting of the active material layers 204 and 205, which are the deposited layers 204 and 205 of the powder 220, is unlikely to be produced. As previously mentioned, the powder 220 is shaped with high precision when the active material layers 204 and 205 are pressed by the reduction rollers 101 and 102, resulting in the electrode sheets 207 and 208 with the active material layers 204 and 205 of high quality.

<Lithium-Ion Secondary Battery Electrode Sheet Manufacturing Method>

The configuration of the manufacturing apparatus 100 by which the lithium-ion secondary battery electrode sheet manufacturing method disclosed herein is carried out has been described above by way of example. The lithium-ion secondary battery electrode sheet manufacturing method disclosed herein may be carried out by any manufacturing apparatus other than the manufacturing apparatus 100 described above. The lithium-ion secondary battery electrode sheet manufacturing method disclosed herein preferably includes the steps described below. Note that the following steps are not limited to the order in which they are described, unless otherwise specified. The electrode sheet manufacturing method disclosed herein includes the steps of:

1 preparing the strip-shaped collector foil 201;
2 preparing the powder 220 of granulated particles (including active material particles and a binder);
3 conveying the strip-shaped collector foil 201;
4 depositing the powder 220 of granulated particles;
5 adjusting the thickness of the powder 220; and
6 pressing the powder 220.

In Step 1, the dual-strip collector foil 201, for example, is prepared.

Figure 11:
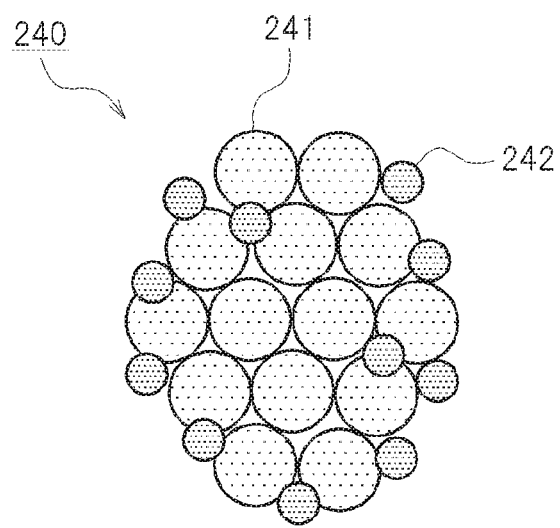
FIG. 11 is a diagram schematically illustrating granulated particles 240.

In Step 2, powder of granulated particles provided by spray drying, for example, is preferably prepared. FIG. 11 is a diagram schematically illustrating granulated particles 240 provided in this step.

As illustrated in FIG. 11 the granulated particles 240 prepared in this step preferably contain at least active material particles 241 and a binder 242. The powder 220 composed of the granulated particles 240 is provided by spray-drying, for example, a mixture (suspension) in which the active material particles 241 and the binder 242 are mixed into a solvent, in this spray drying, the mixture is sprayed into a dry atmosphere. In this case, particles contained in each droplet to be sprayed generally form a lump of granulated particles. Thus, the solid content of the granulated particles 240 changes depending on the size of the droplet, which results in changes in, for example, the size and mass of the granulated particles 240. The droplet to be sprayed preferably contains at least the active material particles 241 and the binder 242. Alternatively, the droplet to be sprayed may contain materials other than the active material particles 241 and the binder 242. For example, the droplet to be sprayed may contain a conductive material and/or a thickener. The granulated particles 240 prepared in this step preferably have an average particle size ranging from about 60 mm to about 100 mm, for example. As used herein, the term "average particle size" refers to a particle size at an integrated value of 50%, i.e., an average particle size at a volume of 50%, in a particle size distribution measured by a particle size distribution measuring device using a laser scattering and diffraction method, unless otherwise specified.

<Active Material Particles 241>

The electrode sheet manufacturing method disclosed herein may be used to manufacture various electrode sheets. For example, the electrode sheet manufacturing method disclosed herein may be used to manufacture both of positive and negative electrode sheets for a lithium-ion secondary battery. The active material particles 241 included in the granulated particles 240 differ according to the type of electrode sheet to be manufactured. For example, when a positive electrode sheet for a lithium-ion secondary battery is manufactured, the active material particles 241 for the positive electrode sheet are used. When a negative electrode sheet for a lithium-ion secondary battery is manufactured, the active material particles 241 for the negative electrode sheet are used.

In Step 3, the strip-shaped collector foil 201 is preferably conveyed by the conveyer 310 as illustrated in FIGS. 3 and 4, for example. Steps 4, 5 and 6, which will be described below, are preferably performed while the strip-shaped collector foil 201 is conveyed in the longitudinal direction.

In Step 4, the powder 220 of the granulated particles is deposited on the strip-shaped collector foil 201 as illustrated in FIGS. 3 and 4, for example. The powder 220 of the granulated particles is preferably supplied from the quantitative feeder 103 onto the collector foil 201. In this step, the powder 220 is supplied onto the collector foil 201 conveyed by the conveyer 310.

In Step 5, the powder 220 of the granulated particles is reproved from the widthwise center portions 202 and 203 of the collector foil 201, and the squeegee 106 is brought into contact with the powder 220 of the granulated particles which remains on the opposite sides of the center portions 202 and 203 of the collector foil 201, thus adjusting the thickness of the powder 220 of the granulated particles. In the example illustrated in FIGS. 3 and 4, the powder remover 108 removes the powder 220 of the granulated particles from the widthwise center portions 202 and 203 of the collector foil 201. Then, the squeegee 106 is brought into contact with the powder 220 of the granulated particles deposited on the opposite sides of the widthwise center portions 202 and 203 of the strip-shaped collector foil 201, thus adjusting the thickness of the powder 220 of the granulated particles.

In this step, the powder 220 deposited on the collector foil 201 is pushed aside to right and left from the center portions 202 and 203 of the collector foil 201, thus removing the powder 220 from the center portions 202 and 203 of the collector foil 201. It is likely that bringing the powder remover 108 illustrated in FIGS. 3 and 4 into contact, on the widthwise center portions 202 and 203 of the collector foil 201, with the incoming powder 220 deposited thereon will smoothly divide the powder 220 into right and left portions, and will smoothly remove the powder 220 from the widthwise center portions 202 and 203 of the collector foil 201. Accordingly, when the powder 220 is deposited across the width of the collector foil 201 and is then pushed aside to right and left from the center portions 202 and 203 of the collector foil 201, the inner edges of the right and left portions of the powder 220 on the opposite sides of the center portions 202 and 203 of the collector foil 201 are shaped with high precision.

When a strip-shaped electrode sheet is manufactured, with no active material layers provided on the widthwise opposite ends of the dual-strip collector foil 201 used as a substrate, i.e., with exposed portions provided on the widthwise opposite ends of the collector foil 201, an alternative method may be performed. For example, although not illustrated, the powder 220 may be deposited across the width of the collector foil 201, and then the powder 220 on the widthwise opposite ends of the collector foil 201 may be removed so as to provide the active material layer-absent regions 202 and 203 serving as exposed portions. In such a method, while the collector foil 201 is conveyed, the powder 220 is deposited across the width of the collector foil 201, and then a squeegee is brought into contact with the opposite ends of the collector foil 201, thus removing the powder 220 deposited on the opposite ends of the collector foil 201. However, in such a method, the powder 220 deposited on the opposite ends of the collector foil 201 remains in regions where the squeegee is brought into contact with the powder 220. From these regions, the powder 220 deposited on the collector foil 201 starts to become irregular in shape. Consequently, the remaining powder 220 tends to be non-uniform on the inner region of the collector foil 201 (i.e., on the widthwise intermediate region of the collector foil 201).

In view of these findings, the present inventors consider it preferable to remove the powder 220 of the granulated particles from the widthwise center portions 202 and 203 of the collector foil 201 as illustrated in FIGS. 3 and 4. More specifically, the present inventors consider it preferable to remove the powder 220 of the granulated particles from the widthwise center portions 202 and 203 of the collector foil 201, and then bring the squeegee 106 into contact with the powder 220 of the granulated particles remaining on the opposite sides of the center portions 202 and 203 of the collector foil 201, so as to adjust the thickness of the powder 220 of the granulated particles.

In Step 6, the powder 220 of the granulated particles, remaining on the opposite sides of the center portions 202 and 203 of the collector foil 201, is pressed. In the example illustrated in FIGS. 3 and 4, the powder 220, whose thickness on the opposite sides of the center portions 202 and 203 of the collector foil 201 has been adjusted in Step 5, is in good condition. Thus, the active material layers 204 and 205 are shaped with high precision.

Step 5 may include guiding the powder 220 of the granulated particles deposited on the strip-shaped collector foil 201 from the widthwise center portions 202 and 203 of the collector foil 201 to the widthwise opposite ends of the collector foil 201, thus removing the powder 220 of the granulated particles from the widthwise center portions 202 and 203 of the strip-shaped collector foil 201 as illustrated in FIG. 4, for example. In the foregoing embodiment, the front end 108a of the powder remover 108 is pressed against the powder 220 on the widthwise center portions 202, and 203 of the strip-shaped collector foil 201, thus guiding the powder 220 of the granulated particles deposited on the collector foil 201 to the widthwise opposite ends of the collector foil 201. This makes it possible to remove the powder 220 of the granulated particles from the widthwise center portions 202 and 203 of the strip shaped collector foil 201, while keeping the powder 220 of the granulated particles deposited on the collector foil 201 in good condition. Consequently, the active material layers 204 and 205 are shaped with high precision.

Step 6 may include pressing the powder 220 of the granulated particles, with a first guide (e.g., the wall 123 in the example of FIG. 4) in contact with the inner edges 220a of the powder 220 of the granulated particles. In that case, the inner edges 204a and 205a of the active material layers 204 and 205 (i.e., the edges of the active material layers 204 and 205 adjoining the active material layer-absent regions 202 and 203) are shaped with high precision.

Step 6 may further include pressing the powder 220 of the granulated particles, with second guides (e.g., the walls 121 and 122 in the example of FIG. 4) in contact with the outer edges 220b of the powder 220 of the granulated particles. In that case, the outer edges 204b and 205b of the active material layers 204 and 205 are shaped with high precision.

In the lithium-ion secondary battery electrode sheet manufacturing method according to the present embodiment, the powder 220 of the granulated particles is deposited on the collector foil 201 that is being conveyed. Subsequently, the powder 220 of the granulated particles is removed from the center portions 202 and 203 of the collector foil 201, the squeegee is brought into contact with the powder 220 to adjust its thickness, and then the powder 220 of the granulated particles is pressed. Thus, the active material layers 204 and 205 provided by shaping the powder 220 on the collector foil 201 are of high quality, which means that the electrode sheets 207 and 208 of high quality are manufactured with stability. Consequently, the electrode sheet manufacturing method according to the present embodiment enhances the yield of the electrode sheets 207 and 208 including the active material layers 204 and 205 composed of the powder 220 of the granulated particles, resulting in improvement in productivity.

Although the lithium-ion secondary battery electrode sheet manufacturing method according to the embodiment of the present invention has been described thus far, the lithium-ion secondary battery electrode sheet manufacturing method disclosed herein is not limited to the foregoing embodiment. In particular, the description and illustration of the manufacturing apparatus, by which the lithium-ion secondary battery electrode sheet manufacturing method is carried out, are not intended to limit the electrode sheet manufacturing method, unless otherwise specified.

Electrode sheets manufactured by the method disclosed herein include active material layers of high quality, and thus a lithium-ion secondary battery including the electrode sheets exhibits low resistance and offers high battery performance. Hence, the lithium-ion secondary battery, including the electrode sheets manufactured by the method disclosed herein, is favorably used in applications requiring high energy density and output density. Such applications include a power source (driving power supply) for a motor installed on a vehicle, for example. The vehicle is not limited to any particular type. Examples of the vehicle include a plug-in hybrid vehicle (PHV), a hybrid vehicle (HV), an electric vehicle (EV), an electric truck, a motorbike, a motor-assisted bicycle, a motorized wheelchair, and an electric railway. Note that a plurality of the lithium-ion secondary batteries may be connected in series and/or in parallel so as to be used as a battery pack.

REFERENCE SIGNS LIST 10 lithium-ion secondary battery
20 battery case
21 case body
22 sealing plate
23 positive electrode terminal
24 negative electrode terminal
30 safety vent
32 filling port
33 sealant
40 wound electrode assembly
50 positive electrode sheet
51 positive electrode collector foil
52 exposed portion
53 positive electrode active material layer
60 negative electrode sheet
61 negative electrode collector foil
62 exposed portion
63 negative electrode active material layer
72, 74 separator
80 electrolyte
100 manufacturing apparatus
101, 102 reduction roller
103 quantitative feeder
104 outer guide
106 squeegee
106a squeegee roller
106b back roller
108 powder remover
108a front end
109 inner guide
121, 122, 123 wall (guide)
200 electrode sheet
201 collector foil
202, 203 active material layer-absent region (center portion, exposed portion)
204, 205 active material layer (deposited layer)
204a, 205a inner edge
204b, 205b outer edge
207, 208 electrode sheet
220 powder
220a inner edge
220b outer edge
240 granulated particles
241 active material particles
242 binder
301 conveying roller
302 driven roller
303 pulley
310 conveyer
312 driving mechanism
320 conveyance path
WL winding axis

The invention claimed is:

1. A method of manufacturing a lithium-ion secondary battery electrode sheet, the method comprising:
a) preparing a strip-shaped collector foil;
b) preparing a powder of granulated particles including active material particles and a binder;
c) conveying the collector foil;
d) depositing the powder on the collector foil;
e) removing the powder from a widthwise center region of the collector foil, and bringing a squeegee into contact with the powder remaining on opposite sides of the center region of the collector foil, thus adjusting a thickness of the powder; and
f) pressing the powder remaining on the opposite sides of the center region of the collector foil;
wherein step e) includes guiding the powder deposited on the collector foil from the widthwise center region of the collector foil to widthwise opposite ends of the collector foil, thus removing the powder from the widthwise center region of the collector foil;
wherein step f) includes pressing the powder remaining on the opposite sides of the center region of the collector foil, with a first guide in contact with inner edges of the powder;
wherein step f) includes pressing the powder remaining on the opposite sides of the center region of the collector foil, with second guides in contact with outer edges of the powder; and
wherein after the powder is deposited on the collector foil and before the squeegee is brought into contact with the powder remaining on the opposite sides of the center region of the collector foil, an excess portion of the powder is prevented from falling off from the opposite sides of the center region of the collector foil by third guides in contact with outer edges of the powder.

* * * * *